W. F. TRAVES.
RIM FOR VEHICLE WHEELS.
APPLICATION FILED NOV. 16, 1917.
1,401,377.
Patented Dec. 27, 1921.
3 SHEETS—SHEET 2.
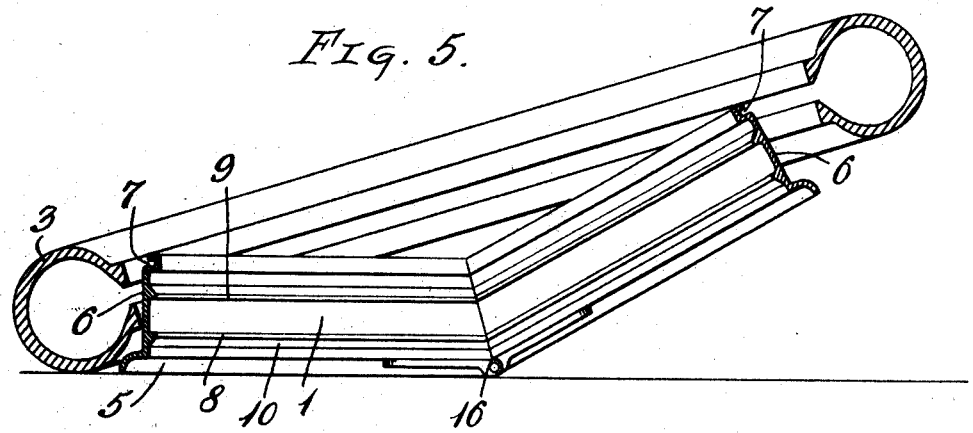
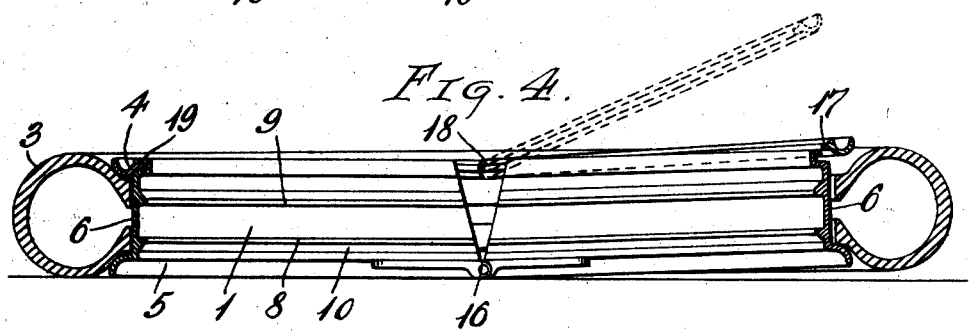
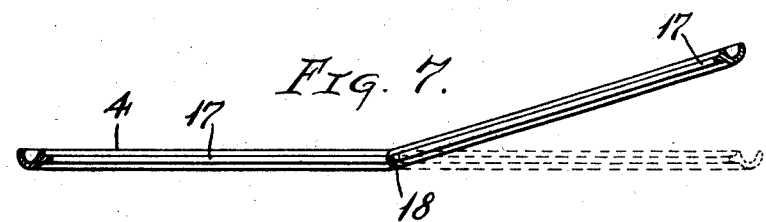
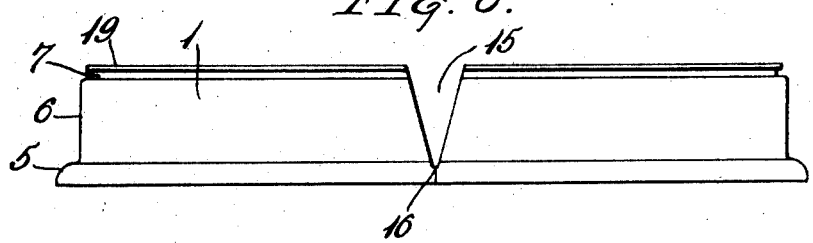
Inventor
Webster F. Traves
By Brockett & Hyde
Attys.

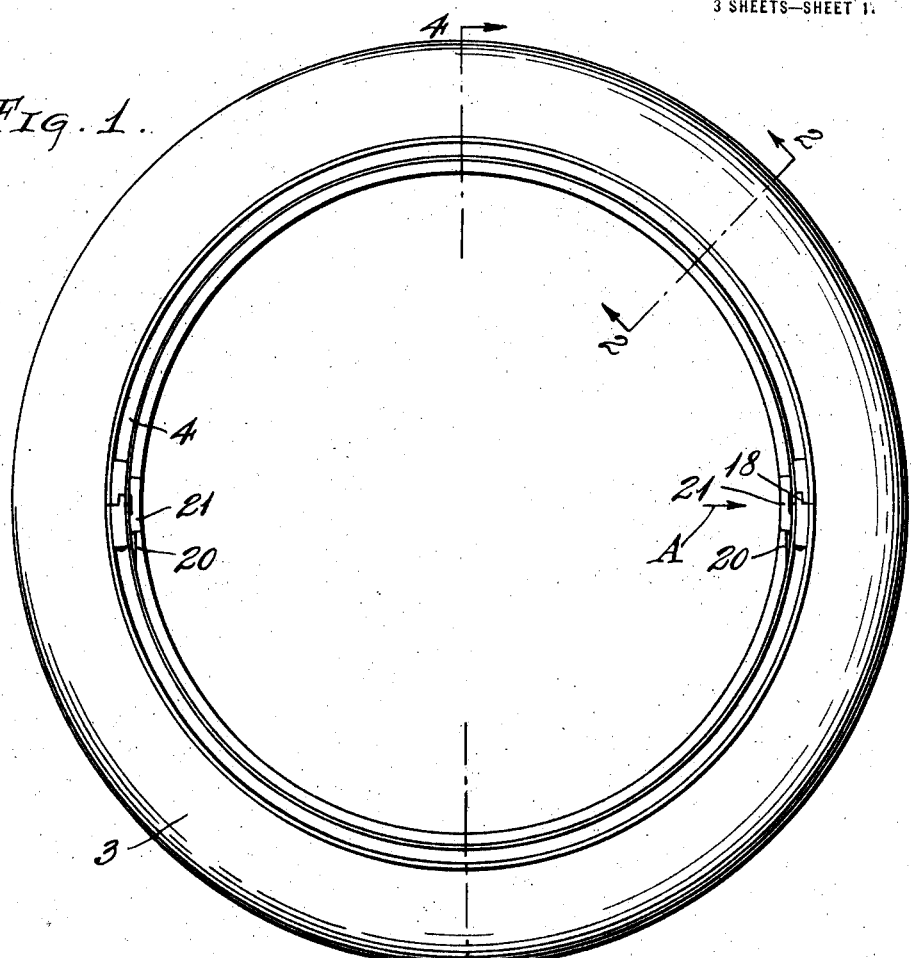
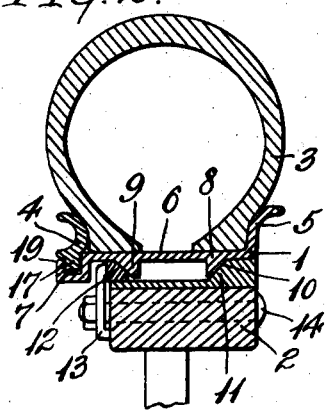
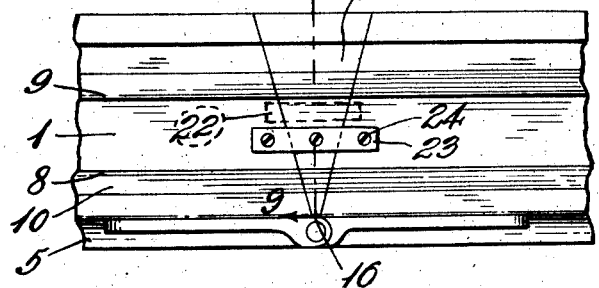

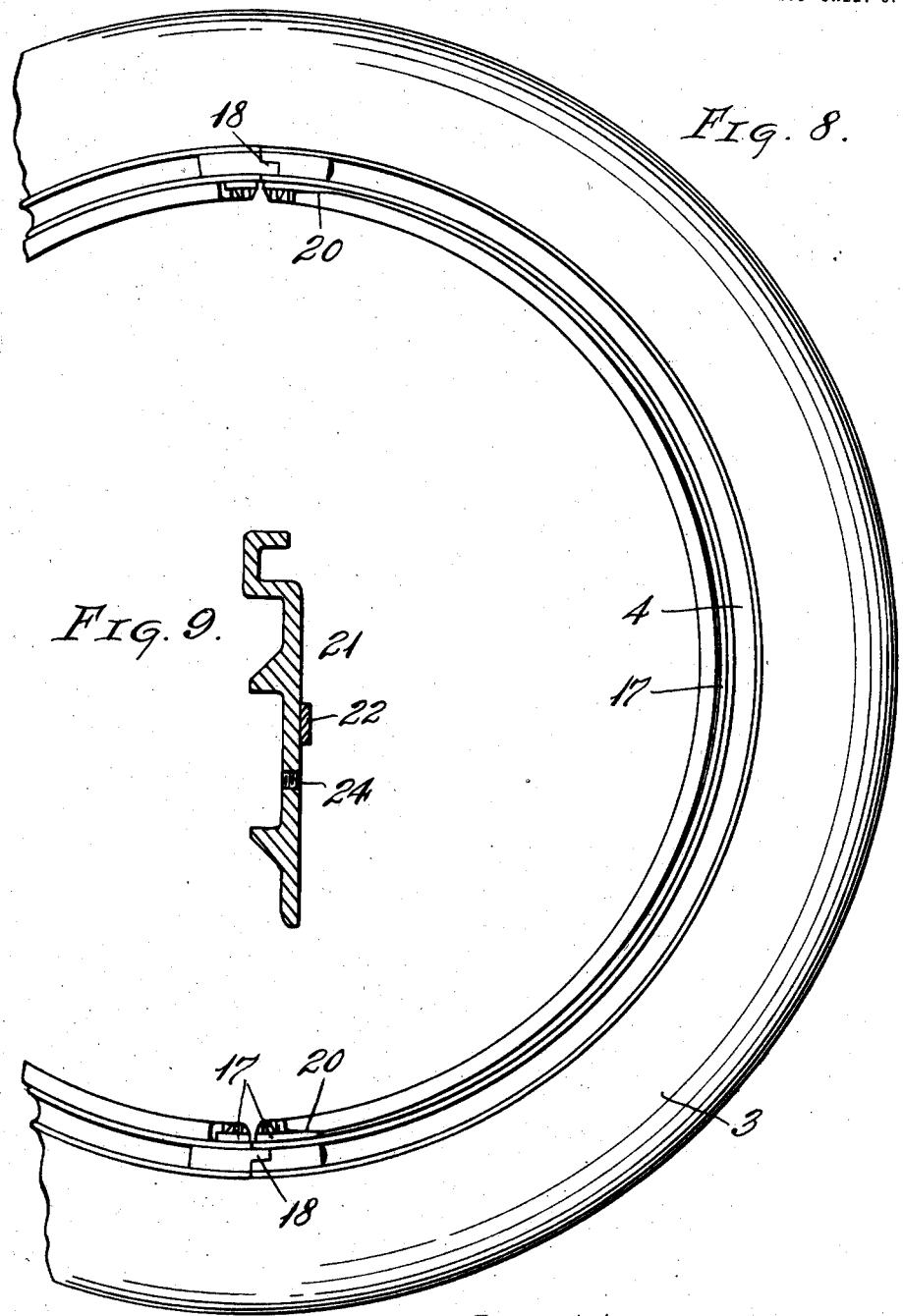

UNITED STATES PATENT OFFICE.

WEBESTER F. TRAVES, OF CLEVELAND, OHIO.

RIM FOR VEHICLE-WHEELS.

1,401,377. Specification of Letters Patent. Patented Dec. 27, 1921.

Application filed November 16, 1917. Serial No. 202,323.

*To all whom it may concern:*

Be it known that I, WEBESTER F. TRAVES, citizen of the United States, residing at Cleveland, in the county of Cuyahoga and State of Ohio, have invented certain new and useful Improvements in Rims for Vehicle-Wheels, of which the following is a specification.

This invention relates to rims for vehicle wheels and more particularly to what are known as demountable rims.

While it is a comparatively simple matter to remove from the felly the ordinary demountable rim, it is nevertheless a difficult and arduous task to remove the tire itself from the rim, and the greater portion of the labor of replacing inner tubes and casings is the labor of removing the casing from the rim and afterward applying it thereto. This is largely due to the fact that when a casing has been on a rim for some length of time it seems to rust fast, and even if it has not rusted fast, the beads at the edges of the casing opening are so stiff and inflexible that it is very difficult to manipulate them in a manner to free them from the rim.

The object of the present invention is to overcome the objections to prior rims of this type and to provide a rim which can be removed from or applied to the felly as easily as prior rims, and which, nevertheless, is so constructed as to enable the casing and tube to be readily removed from the rim with a minimum amount of effort and without requiring the use of special tools or implements.

Further objects of the invention are in part obvious and in part will appear more in detail hereinafter.

The invention comprises the construction and arrangements of parts hereinafter described and claimed.

In the drawings which represent one preferred embodiment of the invention, Figure 1 is a side elevation, illustrating a rim provided with a tire; Fig. 2 is a detail cross section on the line 2—2 Fig. 1, and showing the rim and tire applied to the felly; Fig. 3 is a detail elevation, on a larger scale and looking directly at the joint in the rim in the direction of the arrow A Fig. 1; Fig. 4 is a cross section on the line 4—4 Fig. 1, showing the detachable wedges removed and the binding ring partially detached from the rim; Fig. 5 is a similar view, the binding ring being wholly removed and omitted, and the rim being fully collapsed and separated from the casing; Fig. 6 is a side elevation of the rim; Fig. 7 is a cross section of the binding ring, the plane of the section being the same as Fig. 4; Fig. 8 is a plan view of the tire and rim, on a larger scale, the position of the parts being the same as in Fig. 4; and Fig. 9 is a detail section, on a larger scale, of one of the removable wedges, the section being taken on the line 9—9, Fig. 3.

Like all other rim structures of this class, the present rim structure comprises a rim 1, which is adapted to be supported by and locked on the wheel felly 2 and which in turn serves to support and hold the casing 3, and a binding or holding ring 4, whose function is to lock or confine the shoe or casing 3 upon the rim. These two parts require separate description.

The rim 1, in cross section, may be similar to any of the well known rims of this kind. While its shape may therefore vary in accordance with recognized practice the rim is illustrated as provided along one edge with a peripheral flange 5 to prevent the casing 3 from escaping along this edge of the rim. The casing surrounds the tire seat or rim base 6 of the rim, and said rim at its opposite edge is provided below said surface with a peripheral channel or recess 7. On its inner face the rim is provided with two circumferentially extending ribs, marked 8 and 9 respectively. Rib 8 is provided with the usual inclined surface 10 which seats upon a corresponding inclined surface of an annular rib of the felly band 11. Rib 9 is provided with a similar inclined surface, but on its opposite side, to coöperate with the inclined surface of an annular ring 12 of triangular cross section, which is forced inwardly against rib 9 by the clamping members 13, actuated by the usual bolts 14. This general construction is well known and requires no further description.

Unlike other rims of this type, the present rim consists of two similar semi-circular or half-rim members each having a complete tire seat or rim base preferably connected to each other in any suitable manner to prevent loss, but nevertheless so constructed and arranged as to enable the two halves to be relatively displaced to reduce the peripheral dimension of the complete tire seat or rim base to an amount materially less than the inner circumferential dimension of the casing, whereby the casing can be readily removed from the rim. Several constructions might be utilized for this purpose. In the particular construction shown the rim as a whole is split on a diameter, the meeting end portions of the half rim members being cut away or shaped in any suitable manner, for example as shown in Fig. 6, to form triangular or wedge shaped gaps 15 extending crosswise of the rim. These gaps 15 enable one of the rim members to be displaced with respect to the other, specifically by tilting one member out of the plane common to both, to a position such as illustrated in Fig. 5. The two oppositely disposed gaps in the rim have their wider portions at the channeled edge of the rim from which the casing is to be removed. Therefore, when the rim is collapsed by relatively displacing its two members, as shown in Fig. 5, the effective peripheral dimension or girth of its tire seat or rim base is so reduced that the tire can be readily removed therefrom or applied thereto.

While under some circumstances the two rim members may be detachably connected, nevertheless they are preferably permanently connected, such as by being hinged together at their meeting ends at the points marked 16. The axis of this hinge connection is diametrical and is in the plane of the flanged side of the rim, and the gaps 15 become narrower toward said axis. This hinged connection enables one rim member to be easily tilted or inclined relative to the other, so that the two members approach each other at one side of the rim, to wit, the upper side in Fig. 5, or the leading side during collapsing movement of the rim. The axis of the hinge connection is nearer to the opposite side of the rim, to wit, the lower side in Fig. 5, or the following side during collapsing movement, than to the first named or leading side. Therefore, reduction in girth of the tire side begins with the initiation or very beginning of collapsing tilting movement and is not preceded by an initial increase in girth.

The binding or holding ring 4 may be of any suitable cross sectional shape, but as shown is the usual channeled member having an inner annular rib 17 adapted to seat in the recess 7 of the rim 1. This ring is also so constructed as to enable it to be readily manipulated in attaching it or removing it from therein. Specifically, it comprises two half ring members hinged together on a diametrical axis, as at 18, so that either of its members can be displaced relative to the other by tilting it out of the common plane. The flange 19 forming the outer wall of the channel 7 of the rim, and which is exposed on the ring side of the rim is beveled off slightly on its outer edge at both ends of one of the rim members, as shown at 20 Fig. 1. Assuming that the rim with the tire thereon and the ring in place are lying flat on the floor, if the tire is elevated on the side of the beveled portions of the rim, as shown in Fig. 4, the channeled portion of the rim moves inwardly until finally the rib 17 of the ring escapes from the channel 7 of the rim, as shown in Fig. 8, and the beveled portions 20 of the channel wall enable this half of the ring to be fully freed from the rim and raised to the position shown in dotted lines. The other half of the ring still has its annular rib seated in the channel 7 of the rim, but by pushing the ring to the left in Fig. 4, in the plane of the wheel, the ring can be wholly freed from the rim and laid aside. By then lifting further on the right hand side of the tire and rim, in Fig. 4, the parts reach the position shown in Fig. 5, or more accurately the tire rises alone and the rim drops away from it. The parts may be reassembled by reverse operations.

Suitable means is also provided for locking the parts of the rim and ring together when in assembled relation, so as to make the rim in effect a complete uninterrupted circle. This means comprises two removable wedge members 21, which fit exactly into the gaps 15, and which, as shown in Fig. 8, are of exactly the same cross section as the rim excepting that they have no part corresponding to the rim flange 5. After the parts have been assembled together with the casing on the rim and with the two parts of the rim lying in the same plane and with the ring fully seated in a rim channel, the wedges 21 are pushed into place in their seats in the gaps 15. When the rim and tire are then applied to the felly the pressure of the rib 11 and ring 12 of the felly locks the wedges in place and prevents their escape. I preferably provide said wedges on their outer faces with cross bands or bars 22, whose outer ends extend beyond the inclined edges of the wedges. The projecting ends of these bands lie outside of the end portion of the rim members and prevent the wedges, when seated in locking position as shown in Fig. 3 from escaping inwardly toward the axis of the rim.

Additional locking means may also be provided for preventing loss of the wedges in cases, for example, where the rim is being carried as a "spare." Any suitable means may be used for this purpose, such as the short bars 23, provided with openings 24 through which small screws may be passed into threaded openings in the rim members and wedge members respectively. These parts may be taken off when the rim is applied to a wheel.

The rim described is of simple construction and can be made and sold at low cost. It is very readily manipulated without the use of special tools and enables the tire to be easily removed from or applied to the rim. It is therefore especially useful on the larger sizes which are now so difficult to manipulate.

What I claim is:—

1. A rim for straight side or stiff bead tires, comprising coöperating members each having a tire seat and a tire retaining flange provided with a straight surface extending radially outwardly and engaging the side surface of the tire bead, and connecting means constructed and arranged to permit relative lateral movement between said members, said lateral movement reducing the effective girth of the tire seat and also causing movement of the tire bead relative to said flange surface to thereby loosen the tire from the rim.

2. A vehicle rim, comprising two substantially semi-circular members each having a tire seat, said members being permanently connected to form an annulus and shaped at their meeting ends to form wedge shaped gaps extending across the tire seat, the apices of said wedge shaped gaps lying adjacent one edge of the rim.

3. A vehicle wheel, comprising a plurality of members connected to form an annulus and provided with a casing-confining flange, said members being shaped at their meeting ends to form wedge shaped gaps extending parallel with the rim axis and narrowing toward said flange.

4. A vehicle rim, comprising, two substantially semi-circular members each having a tire seat, said members being permanently connected to form an annulus and shaped at their meeting ends to form wedge shaped gaps extending across the tire seat, and wedge shaped filler members for said gaps.

5. A vehicle rim, comprising two substantially semicircular members each having a tire seat, said members being permanently connected to form an annulus and shaped at their meeting ends to form wedge shaped gaps extending across the tire seat, the apices of said wedge shaped gaps lying adjacent one edge of the rim, and wedge shaped filler members for said gaps.

6. A vehicle wheel, comprising a plurality of members connected to form an annulus and provided with a casing confining flange, said members being shaped at their meeting ends to form wedge shaped gaps extending parallel with the rim axis and narrowing toward said flange, and wedge shaped filler members for said gaps.

7. A vehicle rim, comprising coöperating members forming an annulus and provided along one edge with a casing-confining flange and along the other edge with a peripheral channel, one of said members being adapted to be displaced relative to another and out of their common plane to reduce the effective girth of the complete tire seat or rim base from the flange to the opposite edge.

8. A vehicle rim, comprising coöperating members forming an annulus and provided along one edge with a casing confining flange and along the other edge with a peripheral channel, one of said members being adapted to be displaced relative to another and out of their common plane away from the flanged edge to reduce the effective girth of the channeled edge of the rim, and a binding ring having a portion seating in said channel and a portion forming a second casing confining flange.

9. A vehicle rim, comprising coöperating members forming an annulus and provided along one edge with a casing-confining flange and along the other edge with a peripheral channel, one member being adapted to be tilted relative to the other and to an inclined position to thereby reduce the effective girth of the complete tire seat or rim base from the flange to the opposite edge.

10. A vehicle rim, comprising coöperating members forming an annulus and provided along one edge with a casing confining flange and along the other edge with a peripheral channel, one member being adapted to be tilted relative to the other and to an inclined position to thereby reduce the effective girth of the complete tire seat or rim base from the flange to the opposite edge, and a binding ring having a portion seating in said channel and a portion forming a second casing-confining flange.

11. A vehicle rim, comprising a plurality of members connected to form an annulus and provided along one edge with an outwardly extending casing confining flange and along the opposite edge in its outer face with a channel, said members being shaped at their meeting ends to permit lateral displacement of one member relative to another member to thereby reduce the effective girth of the rim.

12. A vehicle tire rim, comprising two coöperating substantially semi-circular members hinged together on a substantially diametrical axis, whereby they may be relatively tilted to approach each other at one side of the rim, the axis of said hinge being located nearer to the following than to the leading side of the rim during the collapsing movement.

13. A vehicle tire rim, comprising two coöperating semi-circular members connected to form an annulus and provided along one edge with a casing confining flange and along the opposite edge with a channel, said members being hinged together on a substantially diametrical axis whereby they may be relatively tilted to collapse the rim, the axis of said hinge being located nearer to the flanged than to the opposite side of the rim.

14. A vehicle tire rim, comprising two coöperating substantially semi-circular members hinged together on a substantially diametrical axis, whereby they may be relatively tilted to approach each other at one side of the rim, the axis of said hinge being located nearer to the following than to the leading side of the rim during the collapsing movement, the meeting ends of said members being shaped to form wedge shaped gaps extending crosswise of the rim.

15. A vehicle tire rim, comprising two coöperating semi-circular members connected to form an annulus and provided along one edge with a casing confining flange and along the opposite edge with a channel, said members being hinged together on a substantially diametrical axis whereby they may be relatively tilted to collapse the rim, the axis of said hinge being located nearer to the flanged than to the opposite side of the rim, the meeting ends of said members being shaped to provide wedge shaped gaps whose edges diverge toward the channel edge of the rim.

16. A vehicle rim, comprising an annulus having a flange along one edge and an annular channel along its opposite edge, and a binding ring adapted to seat in said channel, said ring comprising two members hinged to each other along a diametrical axis.

17. A binding ring for vehicle rims, comprising two members hinged together along a diametrical axis and provided with an inwardly extending bead.

In testimony whereof I affix my signature.

WEBESTER F. TRAVES.